United States Patent
Paielli et al.

(10) Patent No.: US 9,347,504 B2
(45) Date of Patent: May 24, 2016

(54) VEHICLE DRIVELINE TORQUE MANAGING PROCESS

(71) Applicant: Dana Automotive Systems Group, LLC, Maumee, OH (US)

(72) Inventors: Perry M. Paielli, Clinton Township, MI (US); Richard A. Nellums, Maumee, OH (US); Scott A. Smith, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 52 days.

(21) Appl. No.: 14/571,365

(22) Filed: Dec. 16, 2014

(65) Prior Publication Data

US 2015/0176663 A1    Jun. 25, 2015

Related U.S. Application Data

(60) Provisional application No. 61/918,887, filed on Dec. 20, 2013, provisional application No. 62/011,601, filed on Jun. 13, 2014.

(51) Int. Cl.
*F16D 48/06* (2006.01)

(52) U.S. Cl.
CPC ............. *F16D 48/06* (2013.01); *F16D 48/064* (2013.01); *F16D 2500/1023* (2013.01);
(Continued)

(58) Field of Classification Search
CPC .................. F16D 48/06; F16D 48/064; F16D 2500/1023; F16D 2500/50233; F16D 2500/70404; F16D 2500/70211; F16D 2500/70235; F16D 2500/10412; F16D 2500/50275; F16D 2500/3027; F16D 2500/3021; F16D 2500/3026; F16D 2500/1045; F16D 2500/70626; F16D 2500/30404; F16D 2500/70408; F16D 2500/7041; Y10T 477/78

USPC .......................................................... 701/68
See application file for complete search history.

(56) References Cited

U.S. PATENT DOCUMENTS

| | | | |
|---|---|---|---|
| 3,511,349 | A | 5/1970 | Herscovici |
| 4,829,221 | A | 5/1989 | Grunberg et al. |
| 6,679,362 | B2 | 1/2004 | Berger et al. |
| 7,412,316 | B2 | 8/2008 | Gerhart et al. |
| 7,717,248 | B2 | 5/2010 | Reuschel |
| 8,118,571 | B2 | 2/2012 | Krisher |
| 8,251,873 | B2 | 8/2012 | Zdych et al. |
| 8,490,769 | B2 | 7/2013 | Pritchard |

(Continued)

FOREIGN PATENT DOCUMENTS

DE    WO 2011134451 A1 * 11/2011 ............. F16D 48/06

OTHER PUBLICATIONS

Franklin L. Everett, Industry Today, 1968, Department of Engineering Mechanics, College of Engineering, The University of Michigan.

*Primary Examiner* — Roger Pang
(74) *Attorney, Agent, or Firm* — Marshall & Melhorn, LLC

(57) ABSTRACT

A vehicle driveline torque managing process provides a motor driven actuator that manages clamping forces exerted on a clutch pack and regulates a coupling of power between a driveshaft and one of the axles of a vehicle, based on clutch positions. The process derives coupling torque values by stepping a motor from a maximum clutch separation position through a series of clutch positions while recording a motor driven commanded torque value at each step, up to a maximum clutch compression position having a maximum commanded motor torque value. Then, each motor driven commanded torque value is converted into respective clutch force values as a function of clutch position, thereby relating each clutch torque to a clutch position based on conversion tables stored in a controller that are associated with physical factors that influence clutch torque for each of the respective clutch actuator positions.

16 Claims, 6 Drawing Sheets

(52) U.S. Cl.
CPC .......... *F16D 2500/1045* (2013.01); *F16D 2500/10412* (2013.01); *F16D 2500/1107* (2013.01); *F16D 2500/3021* (2013.01); *F16D 2500/3026* (2013.01); *F16D 2500/3027* (2013.01); *F16D 2500/30404* (2013.01); *F16D 2500/50233* (2013.01); *F16D 2500/50275* (2013.01); *F16D 2500/7041* (2013.01); *F16D 2500/70211* (2013.01); *F16D 2500/70235* (2013.01); *F16D 2500/70241* (2013.01); *F16D 2500/70404* (2013.01); *F16D 2500/70408* (2013.01); *F16D 2500/70448* (2013.01); *F16D 2500/70626* (2013.01)

(56) References Cited

U.S. PATENT DOCUMENTS

| | | | |
|---|---|---|---|
| 8,589,042 B2 | 11/2013 | Williams et al. | |
| 2003/0213668 A1 | 11/2003 | Stevenson | |
| 2006/0009328 A1* | 1/2006 | Jung | F16D 48/06 477/176 |
| 2010/0004837 A1* | 1/2010 | Connolly | F16D 48/064 701/68 |
| 2010/0100294 A1 | 4/2010 | Hirao et al. | |
| 2011/0098897 A1 | 4/2011 | Busdiecker | |
| 2013/0062154 A1 | 3/2013 | Burns et al. | |

* cited by examiner ived Clutch Radius)) to determine the clamping force required from the feedback control (k) to achieve a desired CTL. A calibration factor is used to convert this force into a motor position in a manner of similar operation as the normal operating mode described above.

VEHICLE DRIVELINE TORQUE MANAGING PROCESS

RELATED APPLICATION

This application claims the benefit under 35 U.S.C. §119 (e) of U.S. Provisional Patent Application Ser. No. 61/918,887, filed Dec. 20, 2013 and U.S. Provisional Patent Application Ser. No. 62/011,601, filed Jun. 13, 2014, which are incorporated by reference herein in their entirety.

FIELD OF THE INVENTION

The present invention relates to a driveline control actuator managing torque conduction through a vehicle drive axle assembly. More particularly, the present invention relates to a driveline control actuator managing a clutch clamping force exerted on a vehicle clutch pack for coupling power between a driveshaft and one of the rear axles in a vehicle.

BACKGROUND OF THE INVENTION

It is known that hydraulic actuators are employed in various applications utilizing a source of a pressurized hydraulic fluid, for example, as in friction clutch assemblies and hydraulic brake systems. Also, it is common to create the hydraulic pressure to drive the hydraulic actuators with an electric motor, while utilizing a motor driven screw shaft, a non-rotatable nut threaded to the screw shaft, and a hydraulic piston slidably mounted within a hydraulic cylinder and fixed to the nut.

When the electric motor is actuated, the rotary motion of the screw shaft is transmitted to the nut that linearly travels along the screw shaft. Since the piston is fixed to the nut, it also moves along the screw shaft, thus generating a desired hydraulic pressure which translates to torque from the hydraulic piston applying a clamping force on a friction clutch, as taught in U.S. Pat. No. 8,118,571 to Krisher, which is incorporated herein by referenced.

Specifically, Krisher teaches that the torque capacity of a clutch pack is proportional to the hydraulic fluid pressure applied to a second piston, along the screw shaft. A small amount of torque generated by the electric motor can, therefore, result in a significant amount of force on the second piston. Torque amplification is realized by the lead of the motor drive screw, while force amplification is realized by the ratio of a surface area of the piston head of the first piston to a surface area of the second piston.

Although conventional hydraulic actuators have in the past adequately controlled the transfer of torque from a driveshaft to a vehicle rear wheel, it would be advantageous to have actuators that possess faster response times to control the transfer of torque to a vehicle rear wheel, while providing large travel distances to minimize disengage drag torque. Also, it would be a benefit to detect the position of initial clutch engagement and to compensate for mechanical wear due to friction, malfunction, and/or mis-assembly within a differential and its associated parts.

SUMMARY OF THE INVENTION

A driveline control actuator managing torque conduction through a vehicle drive axle assembly disconnect unit embedded controller (DUEC), which is comprised of an electronic circuit board with electronic components, manages torque conduction through a vehicle drive axle assembly, for example, a differential drive axle assembly. The DUEC controls an attached electric motor driven actuator that manages clamping forces exerted on a clutch pack. The clutch pack regulates a coupling of power between a driveshaft and one of the rear axles of a vehicle, based on clutch position. As a result, the coupling control provides a means to realize vehicle stability and mobility functions.

In a first embodiment, at a time of initialization the DUEC derives coupling torque values (aka coupling torque limits) (CTL), which are torque values from various clutch position measurements and motor torque estimations that serve as indices in a position/force table. To derive the CTL, a drive motor is driven from a full open maximum clutch separation zero reference position, where an estimated motor command torque is from zero through a series of "n" step positions, which would be measured at the motor or elsewhere in a clutch engagement mechanism, and where the motor command torque increases from zero torque to a maximum clutch compression position having a maximum command torque ((0, 1×Tmax/n, (2×Tmax/n), . . . (n×Tmax/n)).

Clutch torque transmission capacity is related to clutch compression, and clutch compression is related to motor torque at each motor position. Consequently, these 0 to "n" motor command torques are converted into 0 to "n" clutch forces, so the indices in the position/force table relate motor position to clutch force, and clutch force can then be used to determine clutch torque capacity.

Then, throughout normal operation, each measured clutch position serves as an index into the position/force table (created upon initialization) for looking-up a corresponding force. In other words, a look-up table is developed, which results in model parameters that are stored within the controller. This look-up table, which is developed in the referencing sequence, would contain motor position versus motor torque data (as shown in FIG. 6). Also, this look-up table would be recalibrated at intervals and used as an input to the controller to allow appropriate transformation from command motor torque to motor position across a range of environmental and machine conditions, throughout machine life given changing characteristics due to wear. Hence, the look-up table provides the position/force relationship to accurately select the present force.

Each present force is then converted into an individual CTL using a coefficient that accounts for robust assembly variations, along with a coefficient ($k_T$) derived from clutch temperature that accounts for clutch variations associated with specific temperatures. Other factors that influence clutch variations could also be used to create additional coefficients for use in this manner. From these present force selections, improvements in accuracy over a clutch operating temperature range are then also realized.

In another embodiment, at the time of initialization, the DUEC derives coupling torque limits (CTL) by commanding a motor to drive the clutch pack to a fully open position, wherein the electric motor driven actuator has a mechanical stop that stops the motor in the maximum clutch separation position (see, for example, stop 102 in FIG. 1A of U.S. Pat. No. 8,490,769 to Pritchard, which is incorporated by reference herein). Once against the mechanical stop, a clutch position is set to 0. Next, the motor is caused to drive the clutch pack toward a fully compressed state where an algorithm based on feedback control (see the block diagram control system illustrated in FIG. 5, possibly a proportional-integral-derivative controller (PID control)) is utilized to drive the motor toward being fully compressed through a series of "k" incrementing clutch compressing positions (for example, k=32). The "Calculate Required Force" may use the equation Clamping force=CTL/(Friction Coefficient×Effective Radius×Number of Friction Surfaces) divided into steps toward the CTL of a fully compressed state.

During each of these "k" clutch positions, the DUEC waits for the motor to stop moving and then another clutch position is recorded along with a commanded motor torque. From these steps is developed a second embodiment table having 32 positions associated with each torque step, wherein it is then known what the clutch position is for each motor torque level of the step sequence.

Further, the amount of torque that can be transmitted through a clutch is Clamping Force×Clutch Friction Coefficient×Effective Radius×Number of Friction Surfaces, wherein the maximum amount of torque that can be transmitted through the clutch is the CTL value, and the clutch friction coefficient is affected by clutch temperature and other influences.

Then, throughout normal operation, each measured clutch position provides a CTL to the controller, which is calculated from the clamping force from the equation Clamping Force=CTL/(Friction Coefficient×Effective Radius×Number of Friction Surfaces). The friction coefficient comes from a separate table, wherein a read clutch temperature is used to look up the friction coefficient from this separate table. Other influences can be included in a similar manner.

In a third embodiment, at a time of initialization, the DUEC derives coupling torque limits (CTL) by commanding a motor to drive the clutch pack to a fully open clutch position, wherein the electric motor driven actuator has a mechanical stop, which stops the motor in the maximum clutch separation position. Once against the mechanical stop, a clutch position is set to zero. Next, the motor is set to drive the clutch pack toward a fully compressed state, where two levels of motor torque are applied. First, a low level (e.g., at approximately a ten percent) of motor torque is applied until the motor stalls, due to a counter force by way of clutch compression. This is followed by a high level (e.g., at approximately a ninety percent) of motor torque that is applied until the motor again comes to a stall due to the higher counter force of the clutch pack at higher compression, wherein at both of these stopped (stalled) points the motor torque and its clutch position are recorded.

Hence, at a given motor torque, the electric motor driven actuator will travel until it reaches equilibrium with resisting forces, at which point the motor torque is related to a clutch position. There, the low and high level of motor torque are where clamp force changes from essentially zero to a value where it begins to increase, and the clutch position where the clamp force is far up the stiff engagement line—as shown in FIG. 6, wherein the stalled position must occur at a static motor torque value.

A first variation to the third embodiment is to drive the clutch at a constant motor torque and monitor speed, wherein more power is required after initial clutch contact and speed would decrease. Analysis of the speed (i.e., position data) response would then be utilized to establish the model parameters.

A second variation to the third embodiment is to drive the clutch while utilizing the feedback control algorithm to a constant motor speed and then monitor motor torque (or current) required. Analysis of the current data would then be used to establish the model parameters.

Hence, two line segments are established from the two points, wherein a low-force line segment defines a relationship of position to motor torque at a condition of compliance when the clutch pack is beginning to be compressed and a high-force line segment defines a relationship of clutch position to motor torque at a condition of compliance when the clutch pack is compressed.

Consequently, the motor torque values at these line segments are converted into corresponding clutch compressing forces, wherein these conversions from motor torques to compressing forces can be done by an equation. Therefore, these lines segments describe the motor position as a function of force applied to the clutch and also a point in force where the position versus motor torque relationship changes from the low force line to the high force line, which concludes the initial calibration phase.

As a result, the amount of torque that can be transmitted through a clutch is Clamping Force×Clutch Friction Coefficient×Effective Radius×Number of Friction Surfaces, which is taken to be the maximum amount of torque that can be transmitted through the clutch and designated clutch Coupling Torque Limit (CTL).

As in the other embodiments, the clutch friction coefficient is affected by clutch temperature. Under normal conditions, the vehicle control provides a CTL to the DUEC, wherein the clamping force is calculated to be: Clamping Force=CTL/(Friction Coefficient×Effective Radius×Number of Friction Surfaces), where the friction coefficient comes from a table, wherein the clutch temperature is used to look up the friction coefficient from this table. Hence, with the required clamping force in hand, a desired position is needed to be achieved and retrieved from the line equations and the intersect point that were derived during initial calibration. From this information, the motor is commanded to go to that position.

Further objects and advantages of the present invention will be apparent from the following description and appended claims, reference being made to the accompanying drawings forming a part of a specification, wherein like reference characters designate corresponding parts of several views.

DESCRIPTION OF THE INVENTION

Figure 1:
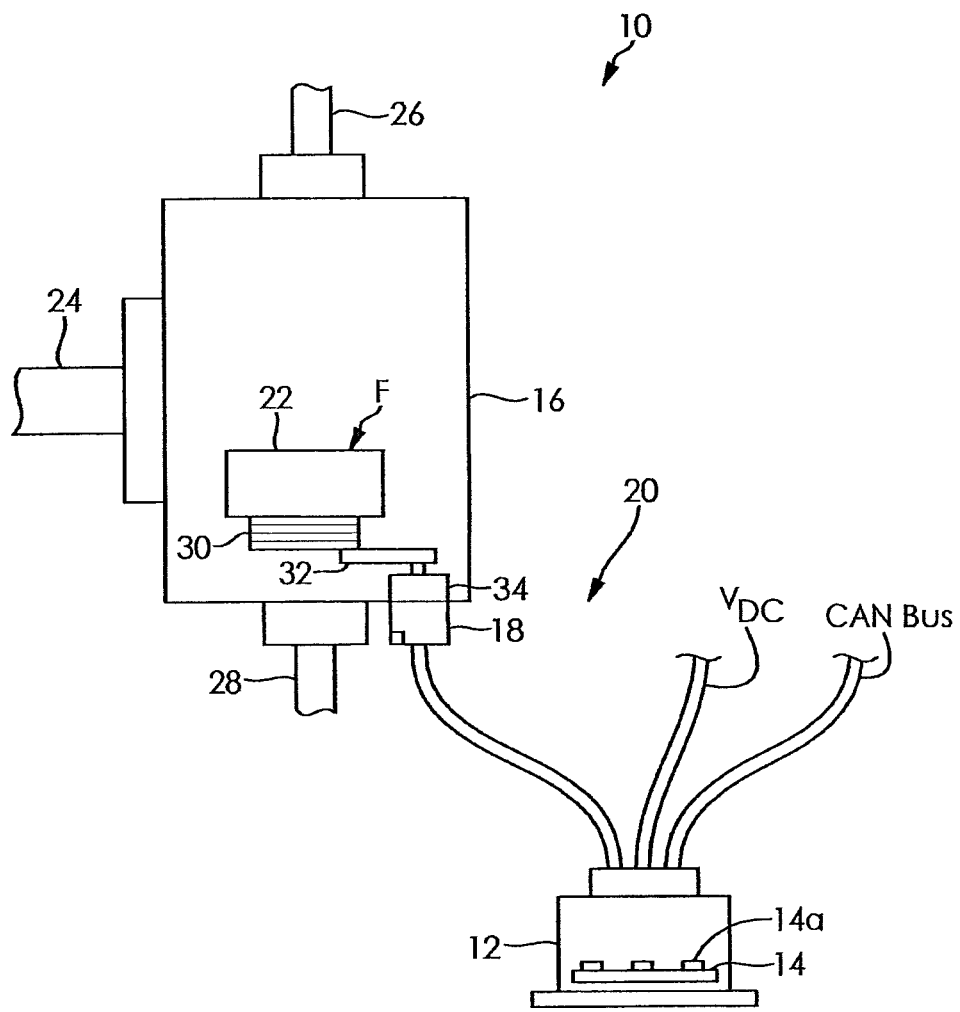
FIG. 1 is an electromechanical schematic of a rear disconnect unit in accordance with the present invention.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise FIGS. 1-7 illustrate a vehicle disconnect unit (DU) 10, which may be a rear disconnect unit, that comprises a drive axle assembly 16 having a differential therein (not shown) and a driveshaft 24 with axles 26, 28. The DU 10 further comprises a motor driven actuator 20 that comprises a disconnect unit embedded controller (DUEC) 12 having an electronic circuit board 14 with electronic components 14a and software.

The drive axle assembly 16 comprises a motor 18, a clutch pack 22, a ball ramp 30 having a plurality of balls 38, gears 32, and an encoder 34, wherein the motor driven actuator 20 manages clamping forces exerted on the clutch pack 22. The encoder 34 provides a motor rotational angle position of the motor magnets relative to the motor stator windings for managing the voltage applied to the motor phases, where the motor 18 is brushless.

Consequently, a logical clutch position indicator is formed from the encoder 34 in conjunction with linear positions determined by the DUEC 12, which are provided by integrating the motor rotational angle, where linear position is proportional to the motor rotational angle. The motor driven actuator 20 manages clamping forces exerted on the clutch pack 22, thereby regulating a coupling of power between the driveshaft 24 and one of the axles 26, 28, which may be on the rear of a vehicle (not shown but common in the art), based on position which is derived from a coupling torque values/limit CTL by stepping the motor 18 from a full open maximum clutch separation position through a series of clutch positions and recording a motor driven command torque value at each step to a maximum clutch compression position having a maximum command torque value, recording a drive motor command torque values (e.g., estimations) at each clutch position, and converting each drive motor driven command torque value into a respective clutch force value as a function of clutch position. Thereby, each clutch torque is related to a clutch position based on conversion tables stored in the controller DUEC 12. These clutch positions, in turn, are associated with physical factors that influence clutch torque for each of the respective clutch actuator positions. These clutch positions may be based on clutch geometry for each of the respective actuator positions.

Figure 2:
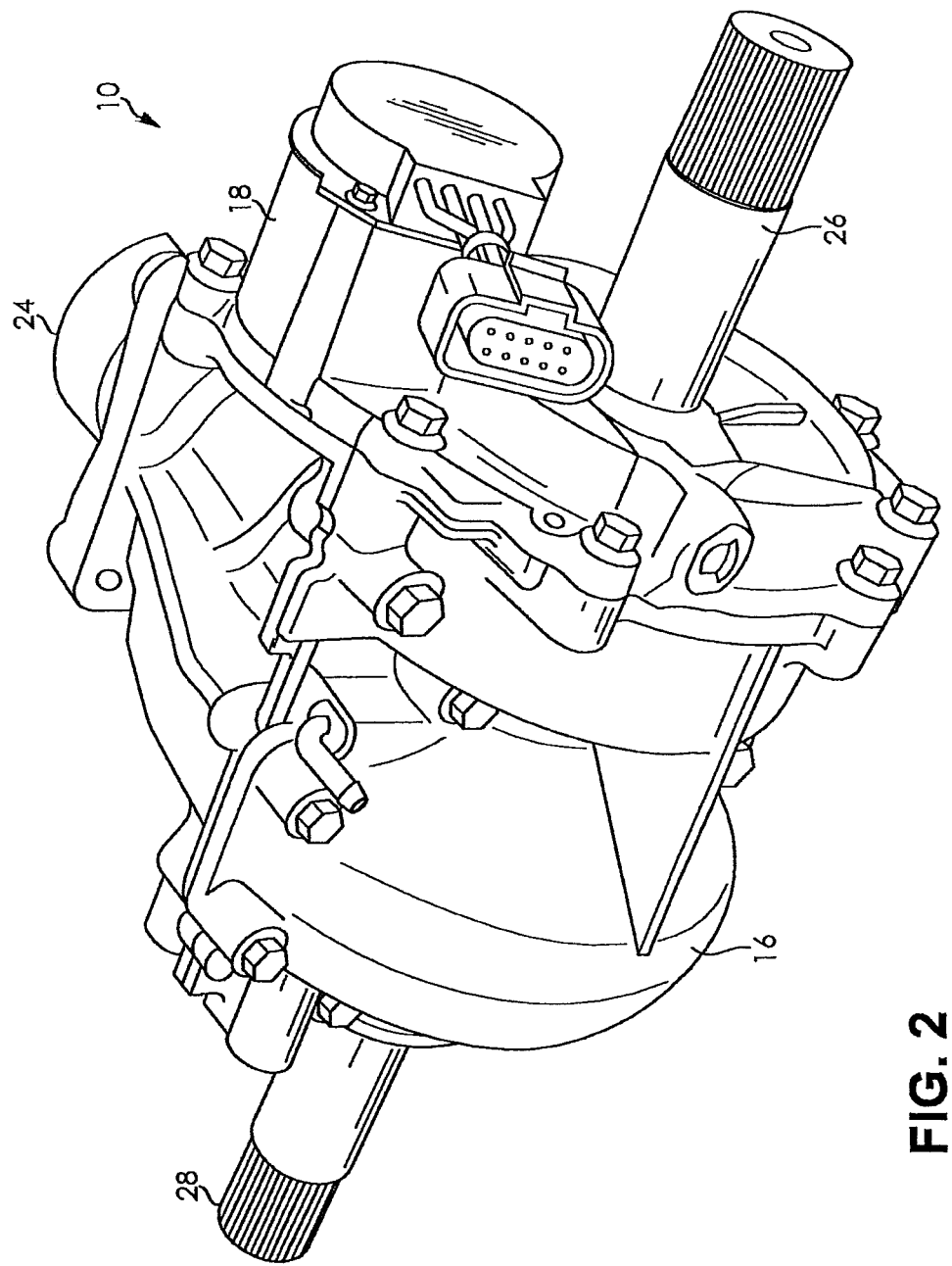
FIG. 2 is a three dimensional view of an assembled rear disconnect unit of FIG. 1.
Figure 3:
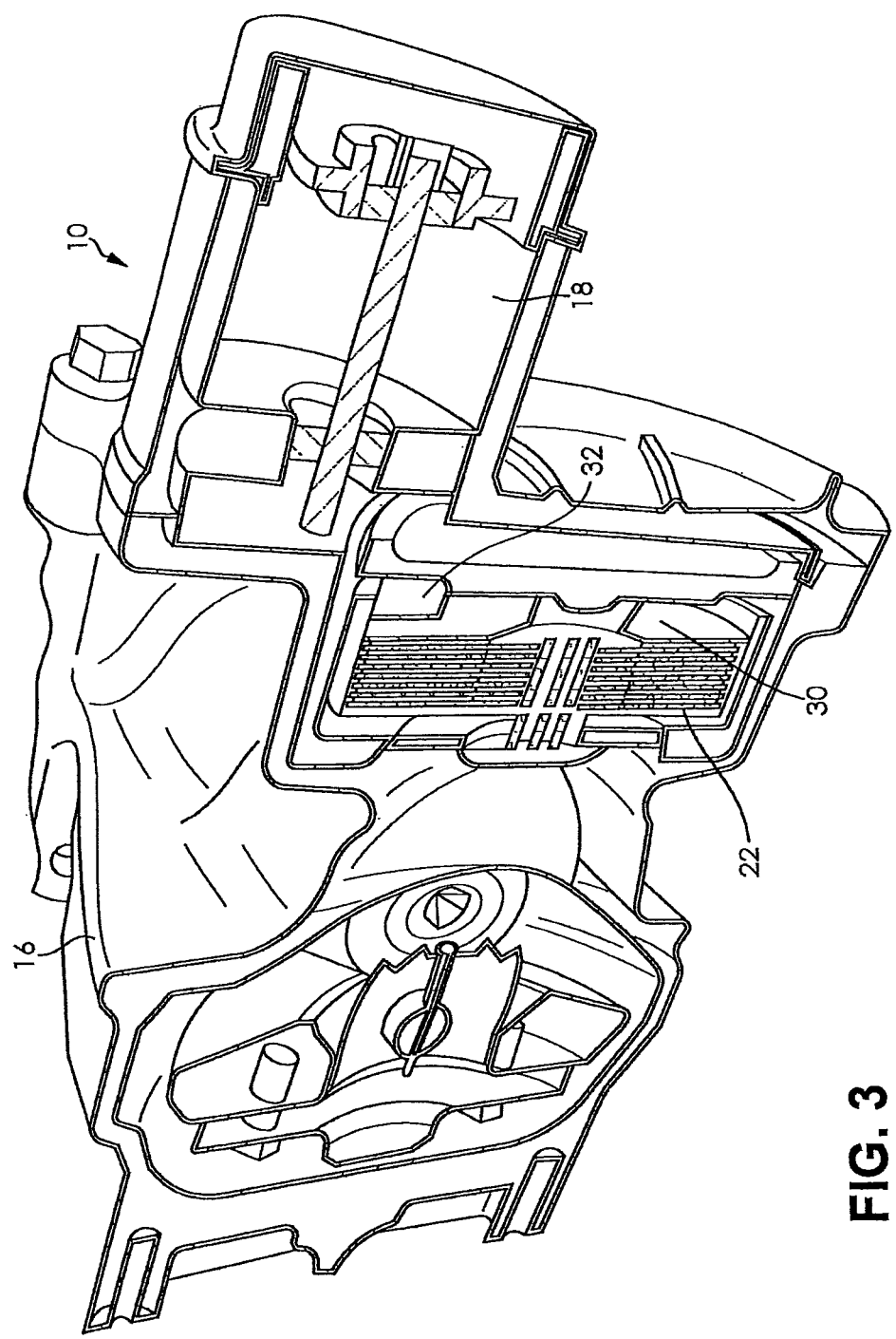
FIG. 3 is a three dimensional cross sectional side view of the rear disconnect unit of FIG. 1.
Figure 4:
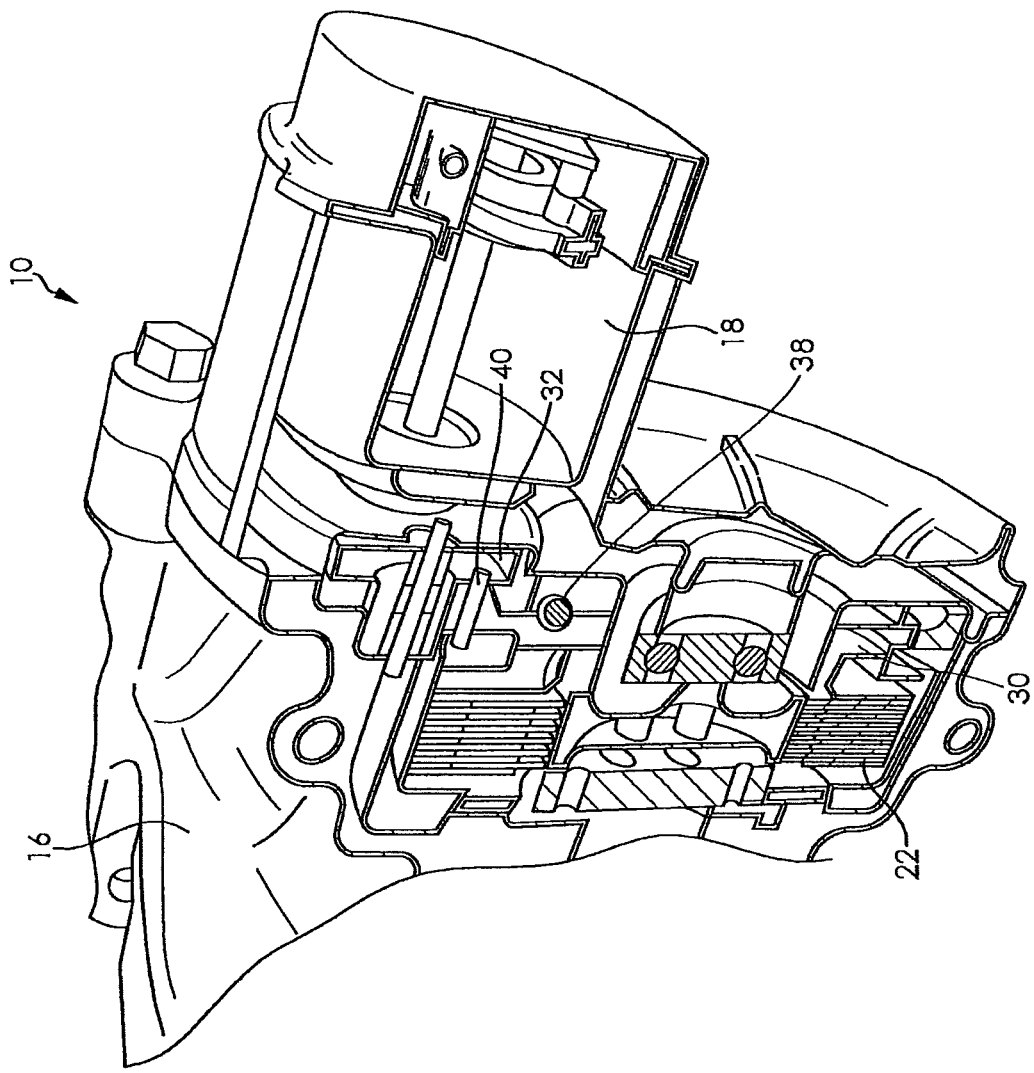
FIG. 4 is a partial three dimensional cross sectional side view of the rear disconnect unit of FIG. 1.
Figure 7:
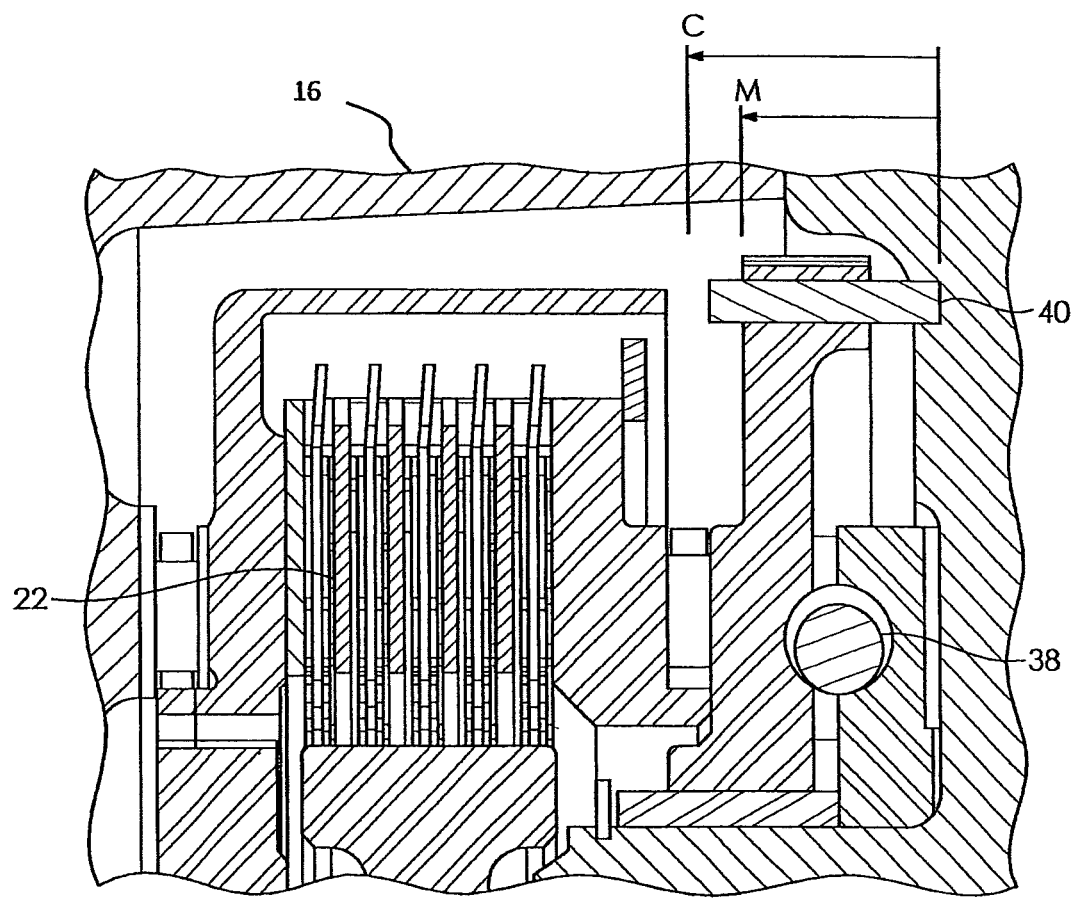
FIG. 7 is a partial cross sectional side view of the rear disconnect unit of FIG. 4.

Specifically, FIG. 2 illustrates an assembled differential drive axle assembly 16 with the electric motor 18, the driveshaft 24 and the rear axles 26, 28 of the vehicle. FIG. 3 depicts a cross sectional view within the differential drive axle assembly 16 with the motor 18, clutch pack 22, ball ramp 30, and gears 32. FIGS. 4 and 7 are further cross sectional views within the differential drive axle assembly 16 showing one of a plurality of balls 38 that functions in a known manner within the ball ramp 30 and a stop 40.

Overall, the DU 10 regulates a coupling of power between the driveshaft 24 and one of the rear axles 26, 28 at a time, where the coupling of power is based on clutch position P. In contrast, conventional actuators couple power based on torque $T_M$, which is the case in the Krisher patent described above. Hence, the control strategy of Krisher simply controls electric motor torque $T_M$ to affect the clutch coupling torque limit. On the other hand, the instant invention has the advantage of controlling to a clutch position, which permits faster control response by performing an initialization process that is disclosed below.

The DUEC 12 is electrically powered by vehicle power VDC and exchanges data with vehicle devices (not shown but common in the art) over, as an example, a CAN bus that conforms to the ISO11898-2 specification. Between the clutch pack 22 and the motor 18 are the ball ramp 30 and the gears 32, which mechanically cooperate with one another in the coupling of power between the driveshaft 24 and one of the rear axles 26, 28.

The DUEC 12 is capable of sensing motor current, supply voltage applied to the controller 12 and other physical factors; like motor position, motor temperature, clutch fluid temperature, an actuator control enable state, and command messages from the CAN bus, which can be stored in corresponding tables in the controller 12. The DUEC 12 is also capable of operating in either of (2) control modes, Position or Coupling Torque. Control set-points are provided in received CAN message data.

Functionally, at a time of initialization, the DUEC 12 derives the coupling torque values taken from various clutch position measurements and motor torque estimations (see Table 1), that serve as indices in the position/force Table 2. To derive the clutch torque values CTL, the drive motor 18 is driven from a full open maximum clutch separation "zero reference position" $P_0$, where a command torque value goes from zero through a series of "n" step positions, where a motor command torque is increasing ((0, 1×Tmax/n, (2×Tmax/n), ..., Tmax), to a maximum clutch compression position having a maximum command torque (n×Tmax/n). In other words, clutch torque capacities are mapped to a series of positions ($P_0$, $P_1$, $P_2$, ..., $P_n$).

Then, throughout normal operation, each measured clutch position serves as an index into the position/force Table 2 (discussed above as being created during initialization) to look-up a present force. Subsequently, Table 2 is utilized to obtain motor torque $T_M$ associated with clutch force $F_C$ that is used to capture a potentially non-linear relationship between motor torque $T_M$ and clutch force $F_C$. Hence, Table 2 provides the position/force relationship for accurately selecting an instant force.

Each present force is then converted into an individual CTL using a constant coefficient that accounts for individual clutch assembly characteristics, along with a coefficient derived from clutch temperature that accounts for clutch variations associated, for example, with specific temperatures. From these present force selections, improvements in accuracy over a clutch operating temperature range are then also realized.

TABLE 1

| Command Torque | Measured Position | | |
|---|---|---|---|
| 0 | $P_0$ | | |
| 1 × $T_{max}$/n | $P_1$ | | |
| 2 × $T_{max}$/n | $P_2$ | ⇒ | ... |
| . | . | | |
| . | . | | |
| . | . | | |
| n × $T_{max}$/n | $P_n$ | | |

Then, the clutch position data of Table 1 is converted into respective clutch forces shown in Table 2, which are based on clutch geometry for each of the respective actuator positions.

TABLE 2

| | | Measured Position | Clutch Force |
|---|---|---|---|
| | | $P_0$ | $F_0$ |
| | | $P_1$ | $F_1$ |
| ... | ⇒ | $P_2$ | $F_2$ |
| | | . | . |
| | | . | . |
| | | . | . |

TABLE 2-continued

| | Measured Position | Clutch Force |
|---|---|---|
| | . | . |
| | . | . |
| | . | . |
| | $P_n$ | $F_n$ |

It is noted that Tables 1 and 2 contain no less than 2×32 elements each and duration of a conversion algorithm does not exceed 1.0 second.

During normal operation, CTL varies as a function of vehicle dynamic control demands. The force required to achieve the given CTL is:

$$F = CTL/(\text{Friction Coefficient} \times \text{Effective Radius} \times \text{Number of Friction Surfaces})$$

Once the force F is calculated, it is used as an index into the look-up table that was created during initialization to look up the clutch position P to where the motor 18 is required to drive. It is understood that a clutch friction coefficient CFC varies over temperature and other physical factors and that it is tracked during operation and stored in tables in the controller 12.

Hence, the embedded controller DUEC 12 better regulates a coupling of power between a driveshaft and one of the axles of a vehicle. The control strategy of the known art, however, which is currently utilized in the industry, simply controls electric motor torque to affect the clutch coupling torque limit. Another of the advantages of the present invention is that it regulates the coupling of power according to clutch position, which permits faster control response time of the DU 10. By monitoring the operating clutch positions and temperature of the DU 10, the present invention can detect mechanical wear, malfunction, and/or mis-assembly within a differential and its associated parts.

Figure 5:
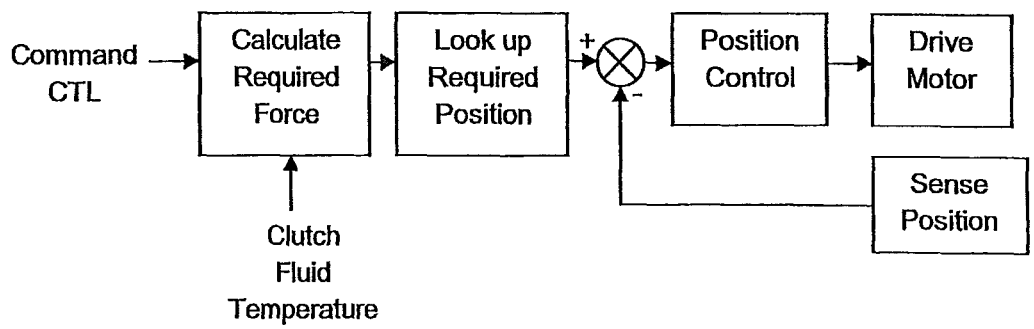
FIG. 5 is a block diagram of a control system strategy in accordance with the present invention.

Consequently, an actuator position determines the CTL, where the clutch position is controlled using the feedback control algorithm of FIG. 5. Gain scheduling, as a function of clutch position, is employed in order to optimize response characteristics. The overall CTL control strategy is constructed as shown in the block diagram of FIG. 5. Also, a force F may be converted into CTL by using the following equation $CTL = k_C k_T F$, where $k_C$ is a clutch assembly characteristics coefficient and $k_T$ is a clutch temperature coefficient. Required clutch position P uses Tables 1 and 2.

Figure 6:
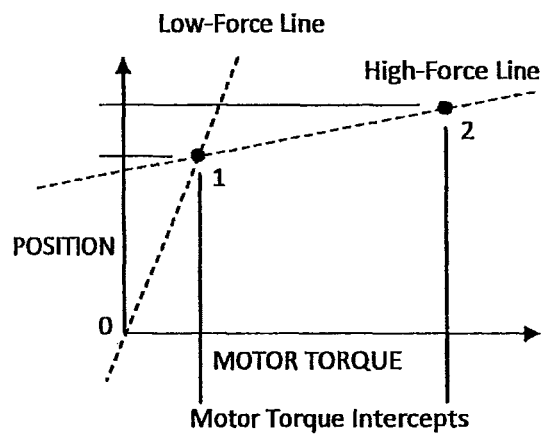
FIG. 6 is a graph of motor torque versus clutch pack position in accordance with the present invention.

FIG. 6 illustrates a graph of motor torque $T_M$ versus clutch pack position in accordance with a third embodiment of the invention. At a time of initialization, the DUEC derives coupling torque values (CTL) by commanding the motor 18 to drive the clutch pack 22 to a fully open clutch position, wherein the electric motor driven actuator 20 has the mechanical stop 40 (as seen in FIGS. 4 and 7), which stops the motor 18 in the maximum clutch separation position M. Once against the mechanical stop 40, a clutch position is set to zero. Next, the motor 18 is set to drive the clutch pack 22 toward a fully compressed position C, where two levels of motor torque $T_M$ are applied. First, a low level motor torque is applied until the motor 18 stalls, due to a counter force by way of clutch pack compression. This is followed by a high level motor torque that is applied until the motor 18 again comes to a stall due to the higher counter force of the clutch pack 22 at higher compression, wherein at both of these stopped (stalled) points the motor torque and its clutch position are recorded.

Hence, the two line segments are established from the two points 0-1, 1-2 in FIG. 6. Therein, a low-force line segment defines a relationship of clutch position P along the vertical axis to motor torque $T_M$ along the horizontal axis at a condition of compliance. When the clutch pack 22 begins to be compressed, a high-force line segment proceeds to define a relationship of clutch position to torque. This results in a condition of stiffer compliance, when the clutch pack 22 is compressed.

Consequently, the motor torque values at these line segments are converted into corresponding clutch compressing forces, wherein these conversions from motor torques to compressing forces can be done by an equation associated with the low-force line segment and the high-force line segment. Therefore, both of these line segments describe the motor position as a function of force applied to the clutch and also a point in force where the clutch position versus torque relationship changes from the low force line to the high force line, which concludes the initial calibration phase.

As a result, the amount of torque that can be transmitted through a clutch is Friction Coefficient×Effective Radius×Number of Friction Surfaces, which is taken to be the maximum amount of torque that can be transmitted through the clutch pack 22 and designated clutch Coupling Torque Limit (CTL).

As in the other embodiments, the clutch friction coefficient is affected by clutch temperature. Under normal conditions, the vehicle control provides a CTL to the DUEC, wherein the clamping force is calculated to be: Clamping force=CTL/(Friction Coefficient×Effective Radius×Number of Friction Surfaces), where the friction coefficient comes from a table, wherein the clutch temperature is used to look up the friction coefficient from this table. Hence, with the required clamping force in hand, a desired clutch position is needed to be achieved and gotten from the line equations (i.e., of FIG. 6) and the intersect point 1 that were derived during initial calibration. From this information, the motor is commanded to go to that clutch position.

An added benefit of the above-described process, as a function of clutch position, is that at the low level motor torque $T_M$ point, the present invention allows for rapid movement through the first clutch position range, which has a low level clutch torque, since motor torque $T_M$ is not significant. Subsequently, more careful movement can be utilized in the higher motor torque $T_M$ clutch position range, where accurate control of clutch position provides quick responsiveness, instead of waiting for small differences in control forces to equalize out. For example, a rapid regulating of the coupling of power between a driveshaft and an axle occurs through the first ten percent of range clutch positions for deriving the coupling torque values therefrom.

There are other sources of variation from clutch force to clutch torque, including amount of oil in a friction material—which changes with compression time, relative slip speed across the friction surfaces, and condition of the friction material surface. Such variability can be compensated by stored look-up tables or by observations during operation or initialization.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle driveline torque managing process, comprising:

providing a vehicle disconnect unit that comprises a drive axle assembly, with a clutch pack and an encoder, and a motor driving an actuator having an embedded controller with software, wherein the actuator manages clamping forces exerted on the clutch pack and the encoder provides motor rotational angle positions corresponding to clutch positions;

regulating a coupling of power between a driveshaft and an axle, based on the clutch positions;

deriving coupling torque values by stepping the motor from a full open maximum separation clutch position through a series of clutch positions and recording a motor driven commanded torque value at each step, up to a maximum compression clutch position having a maximum commanded motor torque value; and converting each of the motor driven commanded torque values into a respective clutch force value as a function of clutch position, thereby relating each commanded torque value to a clutch position in a physical factor conversion table that is stored in the controller, wherein each conversion table based clutch position is associated with a physical factor that influences the commanded torque value for each of the respective clutch positions.

2. The process of claim 1, further comprising converting each clutch force value into a respective clutch coupling torque limit.

3. The process of claim 1, further comprising converting each drive motor commanded torque value into an amount of oil in a friction material.

4. The process of claim 1, wherein the stop stops the motor in a maximum clutch separation position that is set to zero.

5. The process of claim 1, further comprising driving the motor to set the clutch pack in an initially compressed state and applying a lower level, in the order of ten percent, of motor torque, until the motor stalls, as a result of a counter force by way of clutch compression.

6. The process of claim 5, further comprising applying a high level, in the order of ninety percent, of motor torque available until the motor again comes to a stall due to applying a counter force on the clutch pack at increasing compression, wherein both low and high levels of stalled motor torques and both low and high levels of stalled motor positions are recorded.

7. The process of claim 6, further comprising driving the clutch at a constant motor torque and monitoring speed, wherein more power is required after initial clutch contact whereas speed decreases.

8. The process of claim 7, further comprising the steps;
a.) analyzing speeds, based on clutch position data, so as to establish first model parameters; and
b.) monitoring commanded torque values, based on current, using a feedback control algorithm to a constant motor speed, so as to establish second model parameters;

thereby, establishing two line segments from the first and second model parameters, wherein a low-force line segment defines a relationship of clutch position to commanded torque value at a condition of compliance when the clutch pack is beginning to be compressed and a high-force line segment defines a relationship of clutch position to commanded torque value at a condition of compliance when the clutch pack is compressed.

9. The process of claim 8, further comprising converting commanded torque values associated with the two line segments into corresponding clutch compressing forces represented by an equation that describes the motor position as a function of force applied to the clutch and a point in force, wherein the motor position versus commanded torque value relationship changes from the low force line to the high force line, resulting in an initial calibration of a vehicle driveline torque managing process.

10. The process of claim 9, further comprising calculating an amount of torque transmitted through a clutch being equal to Clamping Force×Clutch Friction Coefficient×Effective Radius×Number of Friction Surfaces, wherein the maximum amount of torque that can be transmitted through the clutch being designated as a clutch Coupling Torque Limit (CTL).

11. The process of claim 10, further comprising utilizing a clutch temperature in looking up a friction coefficient from a temperature conversion table, thereby calculating a clamping force by way of the equation: Clamping Force=CTL/(Friction Coefficient×Effective Radius×Number of Friction Surfaces).

12. The process of claim 11, further comprising commanding the motor to go to a desired clutch position associated with the calculated Clamping Force.

13. The process of claim 8, wherein the feedback control algorithm is a proportional-integral-derivative controller closed loop algorithm.

14. The process of claim 1, wherein physical factors that are stored in tables in the controller comprise motor current, supply voltage applied to the controller, motor position, motor temperature, clutch fluid temperature, an actuator control enable state, and command messages from a CAN bus, wherein control set-points are provided in received CAN message data.

15. The process of claim 1, further comprises operating in clutch position mode or coupling torque mode.

16. The process of claim 1, wherein, at a low level clutch torque point, rapidly regulating the coupling of power between a driveshaft and an axle through the first ten percent of range clutch positions and deriving coupling torque values therefrom.

* * * * *